(12) United States Patent
Ferrier et al.

(10) Patent No.: US 10,946,975 B2
(45) Date of Patent: Mar. 16, 2021

(54) TURBOMACHINE COMPRISING A TRAP FOR FOREIGN OBJECTS CIRCULATING IN AN AIR FLOW

(71) Applicant: Safran Aircraft Engines, Paris (FR)

(72) Inventors: Romain Jean-Claude Ferrier, Moissy-Cramayel (FR); Romeo Brogna, Moissy-Cramayel (FR); Jackie Raymond Julien Prouteau, Moissy-Cramayel (FR); Nicolas Joseph Sirvin, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 307 days.

(21) Appl. No.: 15/778,954

(22) PCT Filed: Nov. 25, 2016

(86) PCT No.: PCT/FR2016/053104
§ 371 (c)(1),
(2) Date: May 24, 2018

(87) PCT Pub. No.: WO2017/089730
PCT Pub. Date: Jun. 1, 2017

(65) Prior Publication Data
US 2018/0354638 A1    Dec. 13, 2018

(30) Foreign Application Priority Data

Nov. 27, 2015 (FR) ...................................... 1561517

(51) Int. Cl.
*B01D 39/00* (2006.01)
*B64D 33/02* (2006.01)
(Continued)

(52) U.S. Cl.
CPC .............. *B64D 33/02* (2013.01); *F02C 6/206* (2013.01); *F02C 7/052* (2013.01); *F02C 7/055* (2013.01);
(Continued)

(58) Field of Classification Search
CPC .............. B64D 33/02; B64D 2033/022; B64D 2033/0246; B64D 2033/0293; F02C 6/206;
(Continued)

(56) References Cited

U.S. PATENT DOCUMENTS 3,148,043 A * 9/1964 Richardson ............ B01D 45/08
55/306
3,338,049 A * 8/1967 Fernberger .............. F02C 7/042
60/39.092

(Continued)

FOREIGN PATENT DOCUMENTS

CN         102575582 A    7/2012
WO    WO 2011/045373 A1   4/2011

*Primary Examiner* — Dung H Bui
(74) *Attorney, Agent, or Firm* — Blank Rome LLP

(57) ABSTRACT

A turbomachine of the «open rotor» type or a turboprop engine comprises a nacelle defining an air inlet, a central hub and an annular air intake section surrounding the central hub and opening into a air supply main section, with the central hub comprising a central trap having an aperture for trapping the foreign objects in an air flow entering the turbomachine, and an air recovery channel having a discharge end, through which said air recovery channel opens into the main section, is provided on the central hub.

15 Claims, 4 Drawing Sheets

(51) Int. Cl.
*F02C 6/20* (2006.01)
*F02C 7/052* (2006.01)
*F02C 7/055* (2006.01)

(52) U.S. Cl.
CPC .................. *B64D 2033/022* (2013.01); *B64D 2033/0246* (2013.01); *B64D 2033/0293* (2013.01); *F05D 2220/325* (2013.01); *F05D 2260/607* (2013.01); *Y02T 50/60* (2013.01)

(58) Field of Classification Search
CPC ........ F02C 7/052; F02C 7/055; Y02T 50/675; Y02T 50/671; F05D 2220/325; F05D 2260/607
See application file for complete search history.

(56) References Cited

U.S. PATENT DOCUMENTS

| | | | | |
|---|---|---|---|---|
| 3,368,332 | A * | 2/1968 | Hooper | B01D 45/02 55/306 |
| 3,521,431 | A | 7/1970 | Connors et al. | |
| 4,493,185 | A * | 1/1985 | Hobbs | F02C 7/052 55/306 |
| 4,928,480 | A * | 5/1990 | Oliver | F02C 7/052 60/39.092 |
| 6,702,873 | B2 * | 3/2004 | Hartman | B01D 46/0043 55/434 |
| 9,091,207 | B2 * | 7/2015 | Chanez | F02C 7/05 |
| 2014/0144123 | A1 * | 5/2014 | Judd | B01D 45/06 60/39.092 |

* cited by examiner

TURBOMACHINE COMPRISING A TRAP FOR FOREIGN OBJECTS CIRCULATING IN AN AIR FLOW

CROSS-REFERENCE TO RELATED APPLICATIONS

This application is a national stage of International Application No. PCT/FR2016/053104, filed on Nov. 25, 2016, which claims the benefit of French Patent Application No. 1561517, Nov. 27, 2015, the contents of each of which are incorporated herein by reference.

TECHNICAL FIELD

The present invention relates to a turbomachine of the «open rotor» type or a turboprop engine and more specifically a trap for foreign objects for such a turbomachine.

BACKGROUND

Turbomachines, and specifically turbomachines for aircrafts include an air main circuit which makes it possible to guide air, captured by an air inlet, through a gas generator, so as to generate the thrust required for the movement of the aircraft.

Air entering the turbomachines may contain foreign objects, also called FODs («Foreign Object Damage»), i.e. objects which may damage internal elements of the turbomachine.

Among such objects, sand, small size birds, or water, which quickly turns into ice, at a high altitude, can be mentioned.

To prevent such risks, limiting the number of FODs entering the gas generator, or at least reducing the speed thereof, and thus the shock loads thereof when FODs hit internal elements of the turbomachine, is necessary.

For this purpose, the international patent application WO 2011/045373 in the name of the Applicant, disclosed, as shown in FIG. 1, a turbomachine 10 comprising a nacelle 12 which defines an air intake 14, a central hub 16 and an annular air intake section 18 surrounding the central hub 16, and opening into an air supply main section 20 of a gas generator (not shown). Furthermore, such machine comprises a FOD ejection channel 22 which rejects the FODs out of the nacelle 12, with such ejection channel 22 being connected to the air intake section 18 in way of the junction between the air intake section 18 and the air supply main section 20. This figure shows an axis of symmetry DD of the turbomachine 10, with such axis coinciding with the air flowing direction, i.e. from the upstream portion, or air inlet 14, to the downstream portion of the turbomachine 10.

Although such machine makes it possible to eject the FODs out of the nacelle, it sustains an important ingestion of FODs in the air supply main section 20 and thus remains perfectible.

As a matter of fact, too high an ingestion of FODs in the section 20 may, in the long term, make the machine dangerous, or even useless.

Besides, in order to evacuate the FODs out of the turbomachine 10, it is typically necessary to create an annular duct going through the nacelle of the turbomachine 10 and opening to the outside of the nacelle 10. As the nacelle plays a significant structural role for the turbomachine 10, the structure of the turbomachine 10 has to be reinforced at the expense of the weight, and also and above all, at the expense of the architectural simplicity of the turbomachine 10.

Document U.S. Pat. No. 3,368,332 discloses a turbomachine comprising a nacelle defining an air inlet, a central hub provided with a FOD trap and an annular air intake section surrounding the central hub and opening into an air supply main section of a gas generator. The trap comprises a tubular air recovery channel which goes through the annular air intake section to reach the nacelle, wherein a filter is accommodated, and then opens into the air supply main section, from the nacelle.

The air recovery channel thus generates interferences in the flow of air circulating in the annular air intake section. Such interferences may for instance create a circumferential unbalance of the air flow in the air section.

The air recovery channel being gone through by the air section creates an obstacle which may require modifying and specifically reducing the section of the air recovery channel. Fairing can further be required.

SUMMARY

One specific aim of the invention is to bring a simple, efficient and cost-saving solution to such technical problems, including a simplified architecture of the turbomachine.

For this purpose, it provides for a turbomachine for an aircraft, said turbomachine comprising at least one unenclosed propeller and comprising a nacelle defining an air inlet, a central hub positioned downstream of the air inlet and an air intake section surrounding the central hub and opening into an air supply main section, with the hub comprising a central trap having an aperture for trapping foreign objects contained in an air flow entering the turbomachine, and the air intake section being totally annular about the aperture of the central trap, with the central trap comprising an annular air recovery channel or at least a tubular air recovery channel, with said air recovery channel including a filter for filtering the foreign objects in the recovered air, characterized in that one discharge end of said air recovery channel, through which said air recovery channel opens into the main section, provided on the central hub.

Recovered air can thus be reinjected into the air flow which may supply said gas generator so as to limit the efficiency loss of the turbomachine without said recovery creating any interference in said air flow with a channel going through the section.

In the case of an annular air recovery channel, a better air flow will be guaranteed. Pressure distortions in the air supply main section of said gas generator will thus be avoided.

Such trap makes it possible to separate the FODs from the air flow which can actually be used by the turbomachine, so that it is not damaged by the FODs. The air flow is directed into the annular air intake section and the FODs are directed to the trap, because of their inertia.

According to the invention, the air inlet has an inner diameter having a first extremum, the hub has an outer diameter having a second extremum and the main section has an outer diameter having a third extremum. Such diameters are so selected that the second extremum is out of the parallelogram formed by the first extremum, the third extremum and an axis of symmetry of the turbomachine, in a plane radial to the axis of symmetry.

Then, when the FODs enter the annular air intake section, they will thus bounce against the walls of the annular section, i.e. against the nacelle and the central hub so that they lose speed and energy, before entering the air supply main section, and are thus less dangerous for the internal elements of the turbomachine.

The trap may include an accommodation wherein the foreign objects are retained. Foreign objects can thus be recovered through the front of the nacelle, and neither the air section nor the structure of the nacelle are impacted.

The trap may include two tubular air recovery channels, each one including one said filter. The two tubular air recovery channels are advantageously mutually diametrically opposed. The pressure circumferential distortion at the gas generator inlet will thus be limited.

The filter of the air recovery channel is positioned at the air recovery channel inlet, substantially as an extension of an inner bottom wall of the trap, so as to filter the air circulating from the trap to the air supply main section.

BRIEF DESCRIPTION OF THE DRAWINGS

The invention will be better understood, if need be, and other details, characteristics and advantages of the invention will appear upon reading the following description given by way of a non restrictive example while referring to the appended drawings wherein.

DETAILED DESCRIPTION

Figure 1:
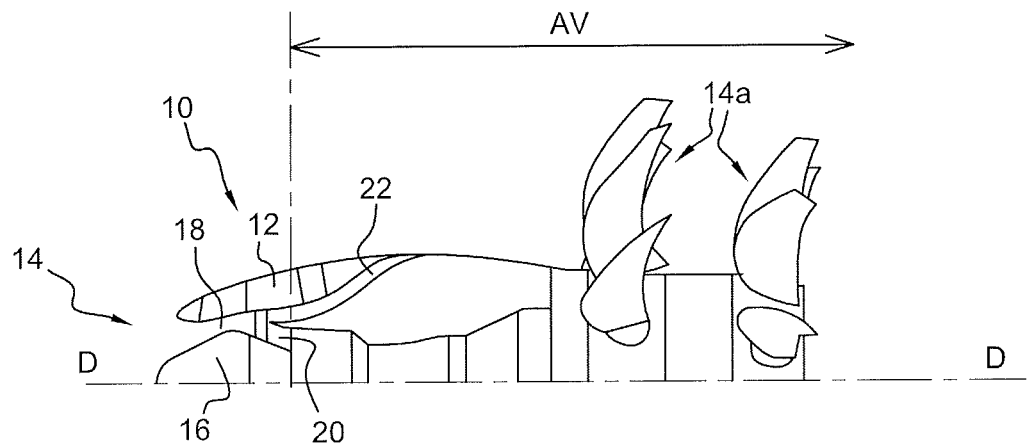
FIG. 1 is a schematic half-view of a turbomachine according to the prior art.
Figure 2:
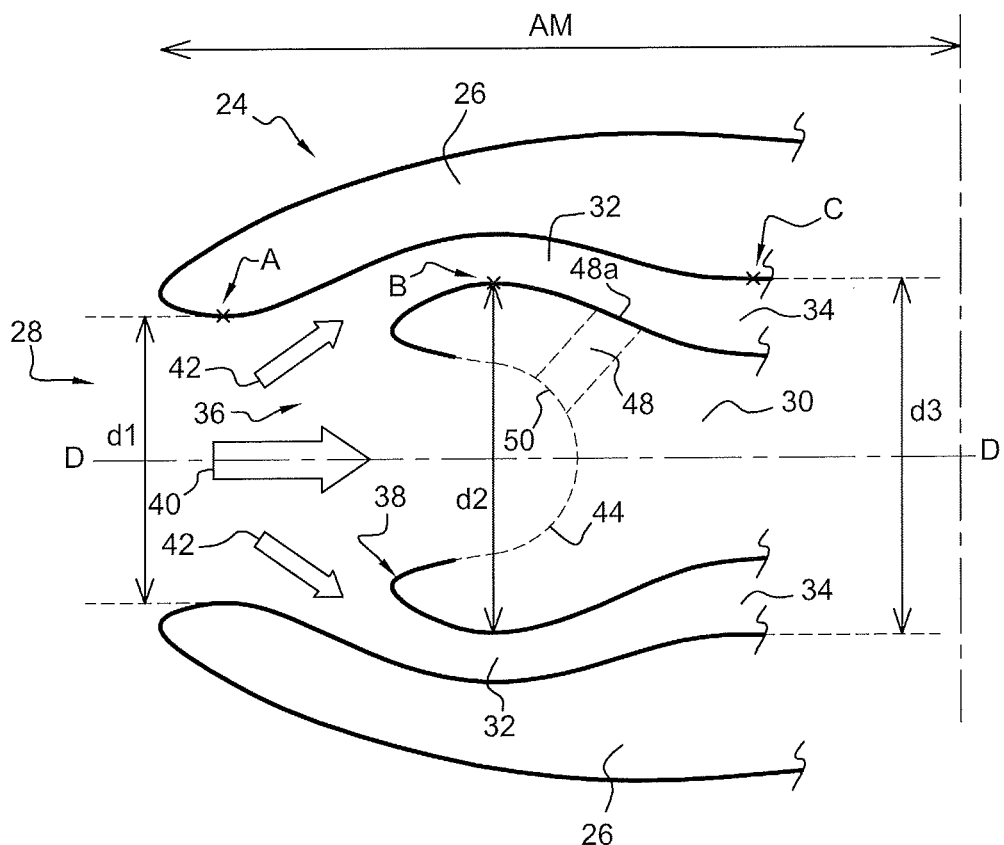
FIGS. 2 to 4 are schematic views in longitudinal section along axis DD, of the upstream portion of a turbomachine according to the invention, showing a first alternative embodiment of the invention.

FIG. 2 shows the upstream portion AM, according to the invention, of a turbomachine 24 for an aircraft. Such turbomachine 24 comprises, in the downstream portion AV thereof, which is common with the prior art, and shown in FIG. 1, at least one unenclosed propeller 14a, and here two such propellers 14a. Such turbomachine 24 also comprises a nacelle 26 defining one air inlet 28, a central hub 30 and an annular air intake section 32 surrounding the central hub 30 and opening into an air supply main section 34 which supplies a gas generator (not shown).

As can be seen in FIG. 2, the central hub 30 is provided with a trap 36, here a recess forming an aperture 38 in the central hub 30, which can retain foreign objects or FODs.

Such FODs may damage the turbomachine 24 when they impact, at full speed, internal elements such as the compressor blades, for instance.

In FIG. 2, the path followed by FODs is shown by the central arrow 40 and the path followed by air to supply the gas generator is shown by the external arrows 42.

However, some FODs which travel along a not rectilinear path or along a specific angle can directly enter the annular air intake section 32.

To remedy such possible event, and prevent FODs from having too high a speed upon their impacting the mobile or fragile elements, FODs must rebound, so as to be slowed down.

For this purpose, the air inlet 28 has an inner diameter d1 having a first extremum A, the central hub 30 has an outer diameter d2 having a second extremum B and the main section 34 has an outer diameter d3 having a third extremum C.

The respective diameters d1, d2, d3 of the air inlet 28, the central hub 30 and the main section 34 are advantageously so selected that the second extremum B is out of the parallelogram formed by the first extremum A, the third extremum C and an axis DD of symmetry of the turbomachine 24, in a plane radial to the axis DD, as shown in FIG. 2. Advantageously, the radial plane is a vertical plane when the machine 24 is mounted on an aircraft.

The FODs which will directly enter the annular air intake section 32 will thus bounce at least against the walls of said section 32, then against the central hub 30 or reversely, first against the central hub 30 and then against the section 32, with such rebounds resulting in the FODs being slowed down and losing energy, which makes same less dangerous for the internal elements of the turbomachine 24.

Figure 3:
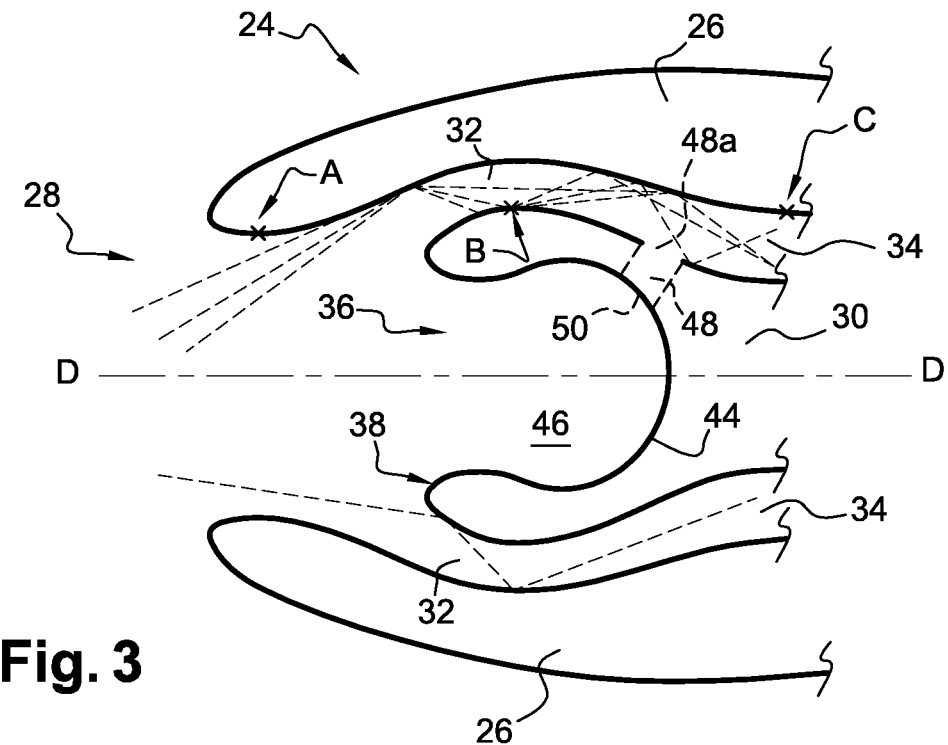

FODs rebounds are shown in FIG. 3 by broken lines. Such paths are shown as examples and do not aim at limiting the possible paths of FODs. Similarly, some FODs may bounce several times against the annular air intake section 32 and against the central hub 30, as shown in FIG. 3.

FIG. 3 shows a first alternative embodiment (also illustrated by FIGS. 2 and 4) of the trap 36 of the turbomachine 24.

The trap 36 comprises a closed inner bottom wall 44 which forms an accommodation 46. FODs are then caught in said accommodation 46 when the turbomachine 24 is operating. A maintenance technician can then empty the trapped FODs from the accommodation 46, using some tools, at regular intervals or upon each stoppage of the turbomachine 24.

Figure 4:
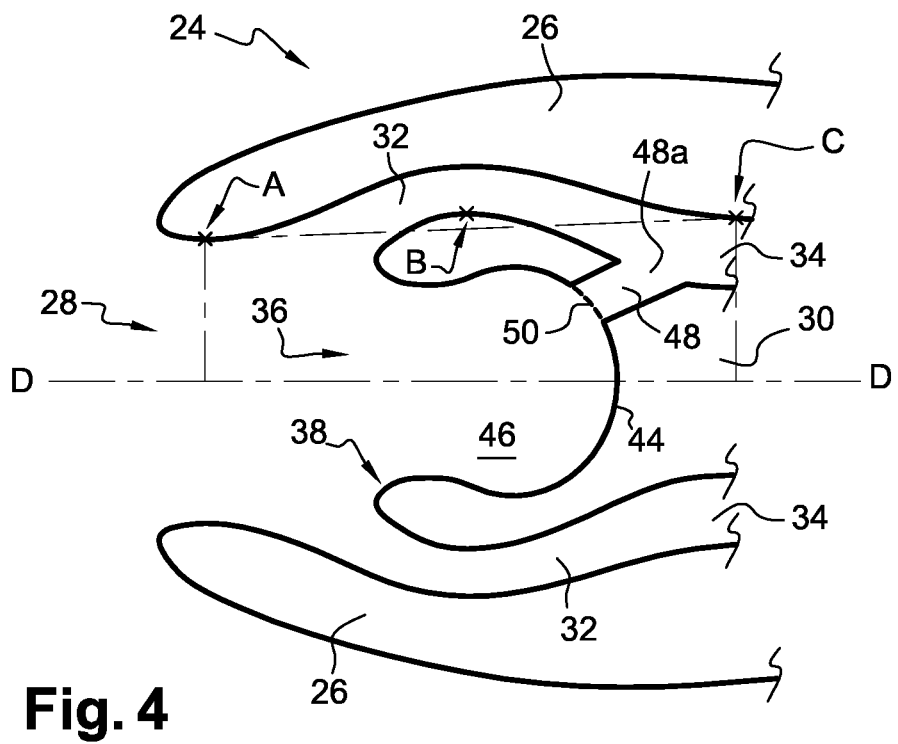

As shown in FIG. 4, the inner bottom wall 44 is provided with at least one aperture forming at least one tubular air recovery channel 48 through which a part of the air flowing together with the FODs in the trap 36 can be reused and injected into the air supply main section 34. The tubular air recovery channel 48 has a discharge end 48a which is positioned on the central hub 30 and through which the tubular air recovery channel 48 opens into the main section 34. The inner bottom wall 44 comprises at least one filter 50, preferably a mesh or a sieve, which makes it possible to retain the FODs in the accommodation 46 and to let air through, from the trap 36 to the air supply main section 34.

The discharge end 48a provided on the central hub 30 makes it possible to simplify the architecture of the turbomachine 24 since no duct is required through the section 34 and the nacelle 26 for the disposal of FODs. The air flow in the main section 34 is thus no longer affected since there is no through duct.

Figure 5:
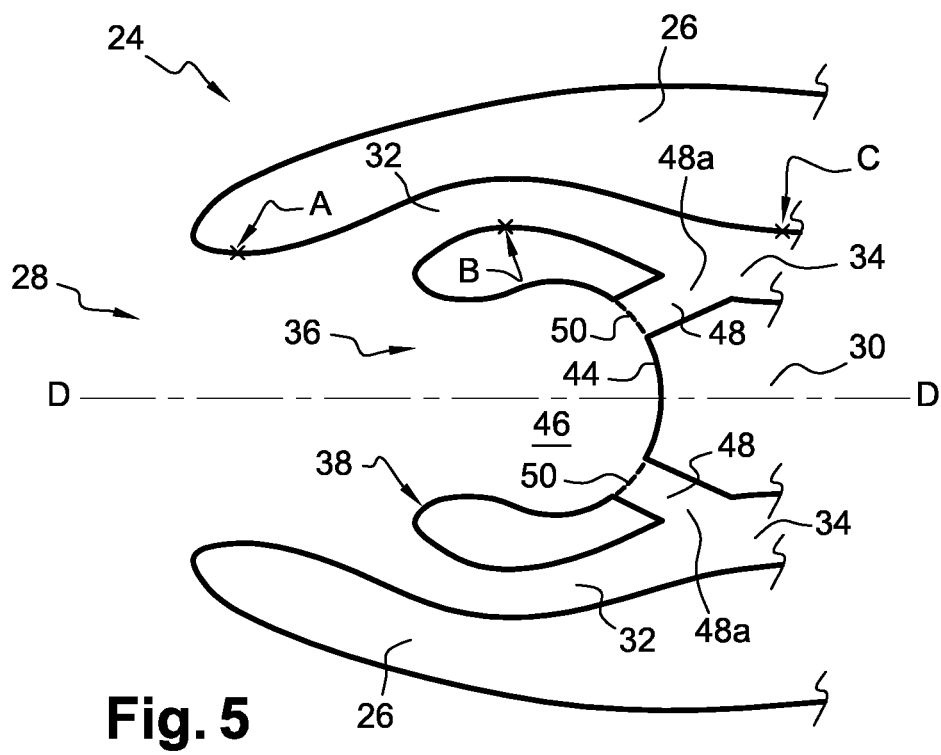
FIG. 5 is a schematic view in longitudinal section along axis DD, of the upstream portion of the turbomachine according to the invention, which shows a second alternative embodiment of the invention.
Figure 7:
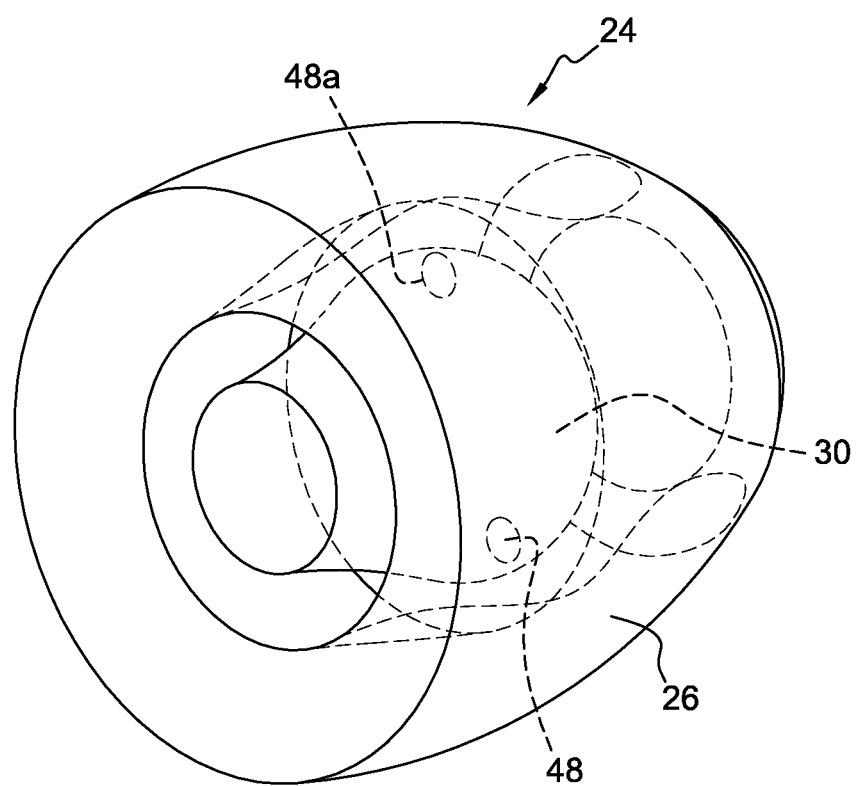
FIG. 7 is a simplified schematic back view of the turbomachine according to the invention, in a second alternative embodiment of FIG. 5.

According to a second embodiment shown in FIGS. 5 and 7, the inner bottom wall 44 is provided with two apertures forming two tubular air recovery channels 48. Of course, the tubular air recovery channel 48 has a discharge end 48a which is positioned on the central hub 30 and through which the tubular air recovery channel 48 opens into the main section 34. The two tubular air recovery channels 48 are mutually diametrically opposed so as to limit the pressure circumferential distortion generated by the partial recovery of the trapped air and the reinjection thereof into the air supply main section 34, with such distortion being particularly significant when the turbomachine 24 is provided with one single tubular air recovery channel 48. The inner bottom wall 44 further comprises, for each tubular air recovery channel 48, one filter 50, preferably a mesh or a sieve, which makes it possible to retain the FODs in the accommodation 46 and to let air through, from the trap 46 to the air supply main section 34. The inner bottom wall 44 can include a larger number of tubular air recovery channels 48, preferably an even number thereof, so as to limit the pressure circumferential distortion.

As disclosed above, a maintenance technician can empty the trapped FODs from the accommodation 46 and clean the filter 50 of the stuck FODs, using some tools, at regular intervals or upon each stoppage of the turbomachine 24.

Figure 6:
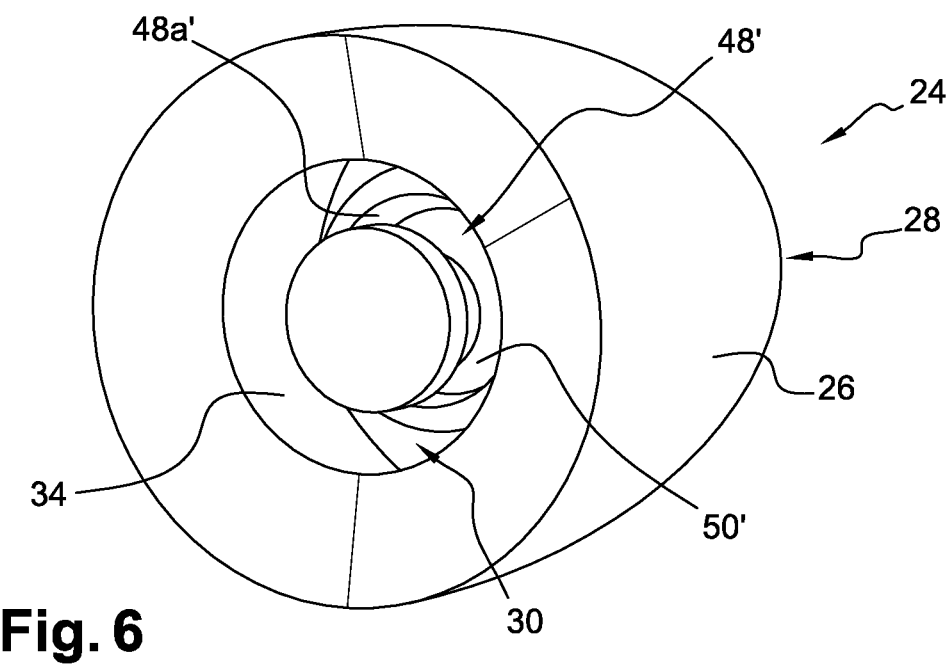
FIG. 6 is a schematic back view of the upstream portion of the turbomachine according to the invention, which shows a third alternative embodiment of the invention.

According to another alternative embodiment shown in FIG. 6, the inner bottom wall 44 is provided with an annular aperture forming one annular air recovery channel 48' through which a part of the air flowing together with the FODs in the trap 36 can be reused and injected into the air supply main section 34. The annular air recovery channel 48' thus has a discharge end (here an annular one 48a') which is positioned on the central hub 30 and through which the annular air recovery channel 48' opens into the main section 34.

The inner bottom wall 44 further comprises at least one annular filter 50', preferably a mesh or a sieve, which makes it possible to retain the FODs in the accommodation 46 and to let air through, from the trap 36 to the air supply main section 34.

Each filter 50, 50' is advantageously positioned at the air recovery channel 48, 48' inlet, substantially as an extension of an inner bottom wall 44.

The turbomachine 24 for aircrafts which has just been disclosed has numerous advantages, among which:
- increased service life of the turbomachine 24 as well as reduced frequency of maintenance of the internal elements of the turbomachine 24;
- increased efficiency of the turbomachine 24;
- reduced mass and overall dimensions of the air inlet 28, and
- simplified architecture of the turbomachine 24.

The increased service life of the turbomachine 24 is provided by adding the trap 36 to the central hub 30. As a matter of fact, most FODs are caught in the trap 36 of the central hub 30. The amount of FODs which can directly enter the annular air intake section 32 loses energy and speed when bouncing, which results in limiting the damage impacts on the internal elements of the turbomachine 24.

This is the reason why maintenance can be reduced, since the internal elements are less damaged. This results in savings in the operation of the turbomachine 24.

The efficiency of the turbomachine 24 is increased by the at least partial recovery of the air trapped with the FODs. The thus recovered air can then be reinjected into the air supply main section 34 to supply the gas generator with a higher air flow rate.

The reduced mass of the turbomachine 24 is obtained by using a portion of the central hub 30 which was not used in the prior art. A smaller quantity of material is thus required for manufacturing the central hub 30, while providing the central hub 30 with a correct rigidity.

Such gain in mass further makes it possible to reduce the fuel consumption of the turbomachine 24 and thus to limit the impact on the environment of the turbomachine 24, specifically as regards the emission into the atmosphere of polluting particles.

Eventually, the simplified architecture of the turbomachine 24 results from the absence of external channels through the nacelle 26 for the disposal of FODs. These channels thus reduce the mechanical strength of the nacelle 26 and increase the complexity of the design to provide a good rigidity of the nacelle 26 while limiting the increase in the mass of the turbomachine 24.

The invention claimed is:

1. A turbomachine for an aircraft, said turbomachine comprising at least one unenclosed propeller and a nacelle defining an air inlet, a central hub positioned downstream of the air inlet and an air intake section surrounding the central hub and opening into an air supply main section, with the central hub comprising a central trap having an aperture for trapping foreign objects contained in an air flow entering the turbomachine, and the air intake section being totally annular about the aperture of the central trap, with the central trap comprising an air recovery channel configured as an annular air recovery channel, with said air recovery channel including a filter for filtering the foreign objects in recovered air, characterized in that one discharge end of said air recovery channel, through which said air recovery channel opens into the air supply main section, is provided on the central hub.

2. The turbomachine according to claim 1, wherein the air inlet has an inner diameter having a first extremum, the central hub has an outer diameter having a second extremum, and the air supply main section has an outer diameter having a third extremum, with the second extremum being outside of a parallelogram formed by the first extremum, the third extremum, and an axis of symmetry of the turbomachine, in a plane radial to the axis of symmetry.

3. The turbomachine according to claim 1, wherein the filter of the air recovery channel is positioned at an inlet of the air recovery channel, as an extension of an inner bottom wall of the central trap, so as to filter air circulating from the central trap to the air supply main section.

4. The turbomachine according to claim 1, wherein the filter comprises a mesh for retaining the foreign objects contained in the air flow passing through said mesh.

5. The turbomachine according to claim 1, wherein the central hub is centered on an axis and has an inner wall, which defines a limit of the aperture of the central trap, and an outer wall, and, radially to said axis, the aperture of the central trap extends between said axis and said inner wall.

6. The turbomachine according to claim 5, wherein the central trap comprises an accommodation wherein the foreign objects are retained.

7. The turbomachine according to claim 5, having a longitudinal axis and wherein the axis on which the central hub is centered is the longitudinal axis.

8. A turbomachine for an aircraft, said turbomachine comprising at least one unenclosed propeller and a nacelle defining an air inlet, a central hub positioned downstream of the air inlet and an air intake section surrounding the central hub and opening into an air supply main section, with the central hub comprising a central trap having an aperture for trapping foreign objects contained in an air flow entering the turbomachine, and the air intake section being totally annular about the aperture of the central trap, with the central trap comprising an air recovery channel comprising a tubular air recovery channel, with said air recovery channel including a filter for filtering the foreign objects in recovered air, characterized in that a discharge end of said air recovery channel, through which said air recovery channel opens into the air supply main section, is provided on the central hub.

9. The turbomachine according to claim 8, wherein the tubular air recovery channel comprises a first tubular air recovery channel, and wherein the central trap comprises a second tubular air recovery channel including a second filter, with the first tubular air recovery channel being diametrically opposed to the second filter of the second tubular air recovery channel.

10. The turbomachine according to claim 8, wherein the air inlet has an inner diameter having a first extremum, the central hub has an outer diameter having a second extremum, and the air supply main section has an outer diameter having a third extremum, with the second extremum being outside of a parallelogram formed by the first extremum, the third extremum, and an axis of symmetry of the turbomachine, in a plane radial to the axis of symmetry.

11. The turbomachine according to claim 8, wherein the filter of the air recovery channel is positioned at an inlet of the air recovery channel, as an extension of an inner bottom wall of the central trap, so as to filter air circulating from the central trap to the air supply main section.

12. The turbomachine according to claim 8, wherein the filter comprises a mesh for retaining the foreign objects contained in the air flow passing through said mesh.

13. The turbomachine according to claim 8, wherein the central hub is centered on an axis and has an inner wall, which defines a limit of the aperture of the central trap, and an outer wall, and, radially to said axis, the aperture of the central trap extends between said axis and said inner wall.

14. The turbomachine according to claim 13, wherein the central trap comprises a convex cavity into which the aperture opens downwardly and wherein the foreign objects are retained.

15. The turbomachine according to claim 13, having a longitudinal axis and wherein the axis on which the central hub is centered is the longitudinal axis.

* * * * *